Figure 1:
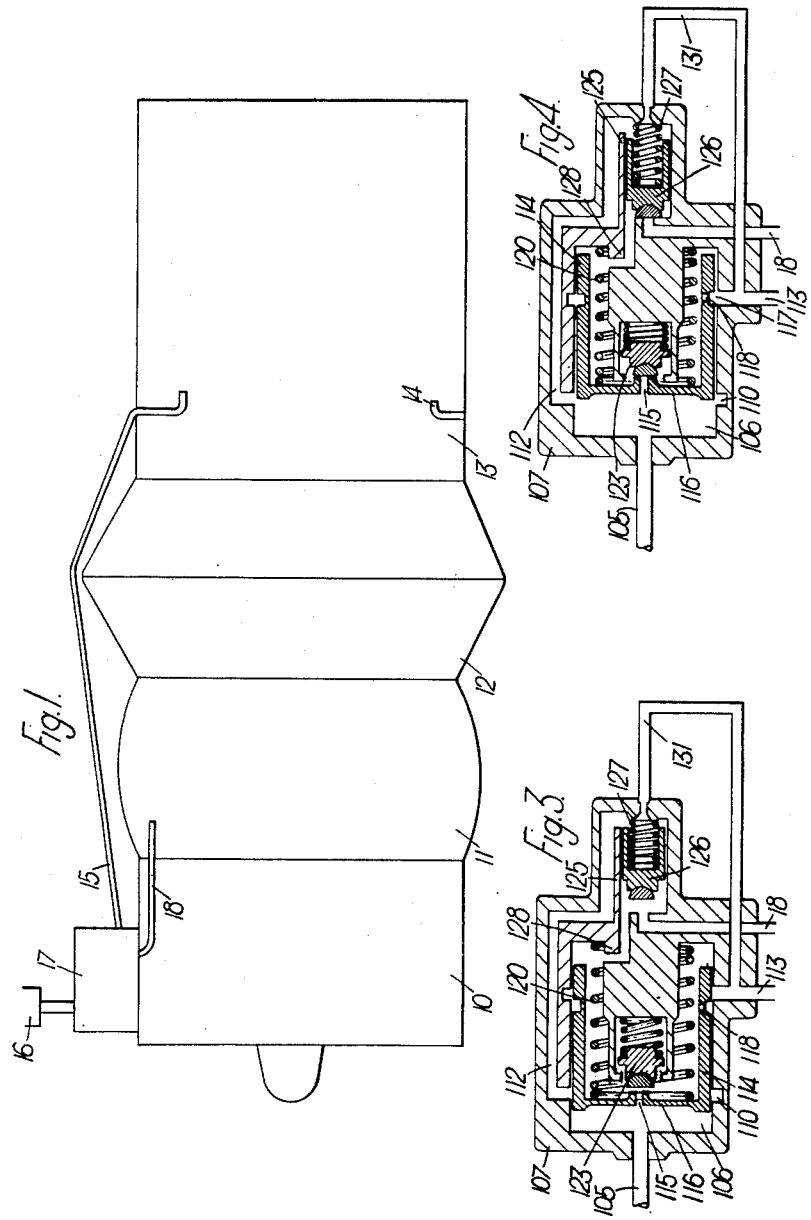

July 21, 1964  J. R. SIMPSON ETAL  3,141,298
REHEAT APPARATUS FOR A GAS TURBINE ENGINE
Filed Nov. 13, 1961  3 Sheets-Sheet 1

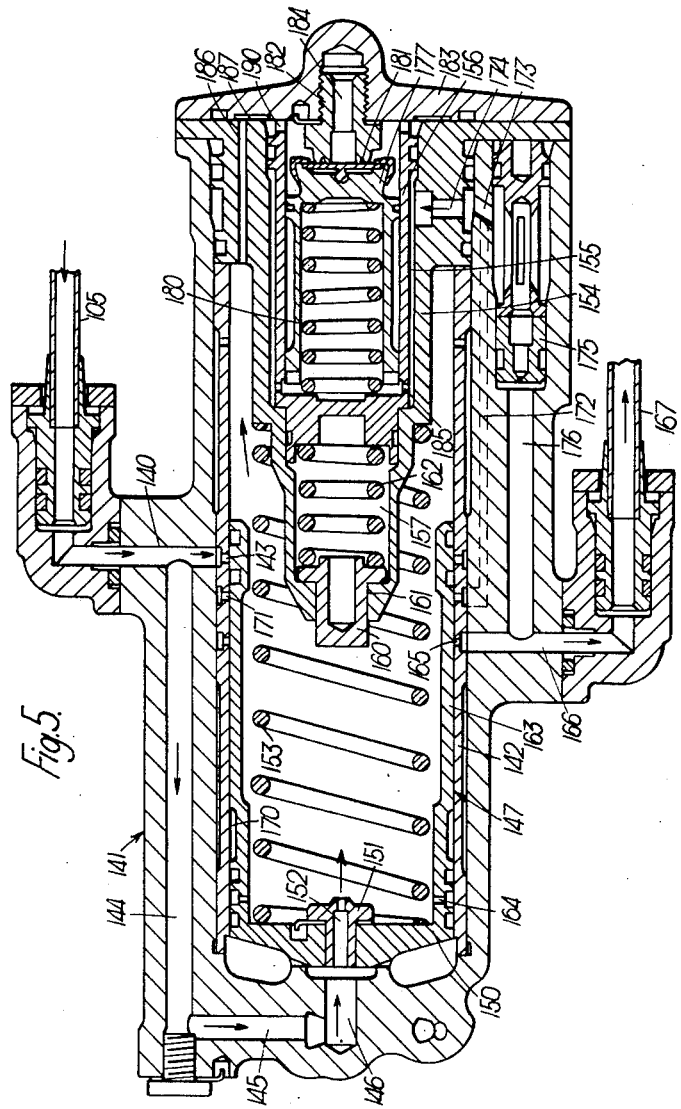

United States Patent Office 3,141,298
Patented July 21, 1964

3,141,298
REHEAT APPARATUS FOR A GAS TURBINE ENGINE
James Reginald Simpson, Littleover, and Gordon Cyril May, Allestree Park, England, assignors to Rolls-Royce Limited, Derby, England, a company of Great Britain
Filed Nov. 13, 1961, Ser. No. 151,707
Claims priority, application Great Britain Nov. 15, 1960
6 Claims. (Cl. 60—35.6)

This invention concerns reheat apparatus for a gas turbine engine.

According to the present invention, there is provided reheat apparatus for a gas turbine engine comprising a source of reheat fuel, reheat combustion equipment having a fuel conduit leading thereto, control means settable to operative and inoperative positions in which it respectively permits and cuts off a flow of reheat fuel from said source to said fuel conduit, and ignition effecting means for effecting ignition of the reheat fuel at the reheat combustion equipment, the ignition effecting means being brought into operation upon the control means being set in the said operative position and a flow of reheat fuel being supplied to the reheat combustion equipment.

In the preferred form of the present invention there is provided a gas turbine engine comprising in flow series a compressor, main combustion equipment, a turbine and an exhaust duct, reheat combustion equipment mounted in said exhaust duct and having a fuel conduit leading thereto, a source of reheat fuel, control means settable to operative and inoperative positions in which it respectively permits and cuts off a flow of reheat fuel from said source to said fuel conduit, and "hot shot" supply means for supplying to the main combustion equipment a quantity of fuel to form a "hot shot" adapted to ignite the reheat fuel at the reheat combustion equipment, the "hot shot" supply means being brought into operation for a limited period upon the control means being set in the said operative position and a flow of reheat fuel being supplied to the reheat combustion equipment.

Preferably there are means for bringing the "hot shot" supply means into operation for a limited period when the pressure in the said fuel conduit exceeds a predetermined value.

The "hot shot" supply means preferably comprises a fuel passage having a flow control valve therein which is resiliently urged towards the closed position, and means for effecting opening of the flow control valve for a limited period when the pressure in the said fuel conduit exceeds the said predetermined value.

Thus the fuel passage, on the upstream side of the flow control valve, may communicate with the fuel conduit so that the fuel pressure in said fuel conduit and said fuel passage are functionally related to each other, whereby when the control means is set in the operative position the fuel pressure in the fuel passage rises so as to effect opening of the flow control valve.

The fuel passage is preferably provided, upstream of the flow control valve, with a second valve which controls fuel flow into the fuel duct, the fuel duct communicating with the flow control valve so as to be adapted to apply pressure thereto in a valve closing direction, the second valve being resiliently urged towards a closed position but being adapted to be opened by the pressure in the said fuel passage when a limited time has elapsed after the opening of the flow control valve.

Preferably, when the said second valve is opened, it establishes communication between the fuel passage and a drain passage, whereby all the fuel passing through the fuel passage is passed to the drain passage so as to by-pass the main combustion equipment.

A fuel control unit, which regulates the quantity of reheat fuel supplied to the reheat combustion equipment is preferably interposed between the said source of reheat fuel and the said control means, the fuel control unit comprising a metering orifice, a pump for pumping the reheat fuel through said metering orifice, and means for varying the flow through the metering orifice.

The fuel control unit may comprise a by-pass passage extending between the low and high pressure sides of said pump, flow through said by-pass passage being controlled by a shut-off valve.

Pressure regulating means may be provided for ensuring that the pressure drop across the metering orifice is maintained to within a desired range. Thus the pressure regulating means may comprise a throttle valve which controls flow through a by-pass duct extending between the low and high pressure sides of said pump, opposite pressure faces of said throttle valve being respectively subjected to pressures prevailing on opposite sides of said metering orifice.

Preferably the fuel control unit comprises a metering valve which is movable to vary the flow through the metering orifice, means for applying to oppositely facing pressure surfaces of said metering valve pressures which are functionally related to engine operating air or gas pressures, and means for varying the pressure applied to one of said pressure surfaces.

The said fuel conduit may contain a pressurising valve which is maintained open only when the fuel pressure in said fuel conduit exceeds a predetermined value, the fuel conduit, on the upstream side of said pressurising valve, communicating with a drain conduit flow through which is controlled by the said control means, whereby when the said control means is open to permit free flow through the said drain conduit, flow through the fuel conduit is prevented by the pressurising valve.

Figure 2:
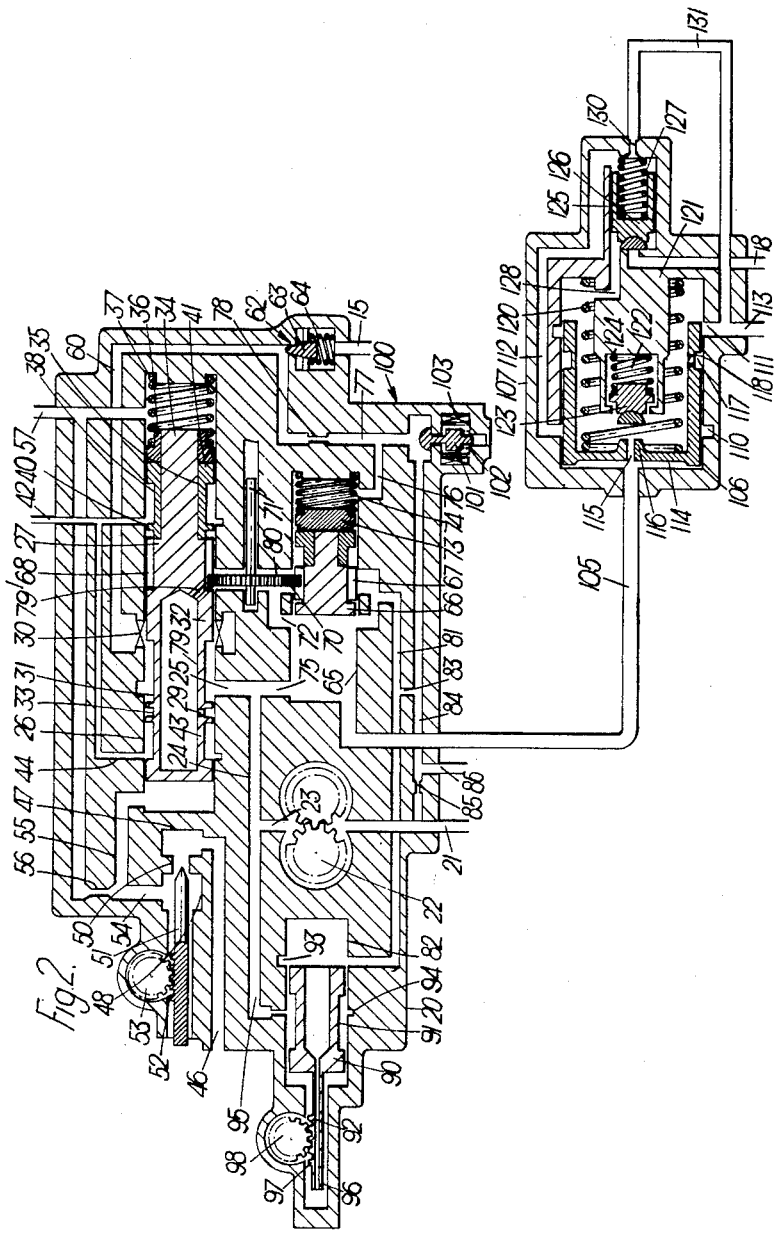

The invention is illustrated, merely by ways of example in the accompanying drawings in which:

FIGURE 1 is a diagrammatic side elevation of a gas turbine engine having reheat apparatus according to the present invention, FIGURE 2 is a section through a portion of said reheat apparatus showing the parts in one particular position, FIGURES 3 and 4 show a portion of the structure of FIGURE 2, with the parts thereof in different positions, and FIGURE 5 is a sectional view of a modification of the portion of the structure shown in FIGURES 3 and 4.

The terms "left" and "right" as used in this specification are to be understood to refer to directions as viewed in the drawings.

Referring to the drawings, a gas turbine engine for an aircraft, e.g. a vertical lift engine, comprises in flow series a compressor 10, main combustion equipment 11, and a turbine 12, the turbine exhaust gases being directed to atmosphere through a jet pipe 13.

Mounted in the jet pipe 13 are reheat fuel burners or injectors 14 which are supplied with reheat fuel through a fuel conduit 15. The reheat fuel for the burners 14 is derived from a tank 16 from which the fuel passes to the fuel conduit 15 by way of a fuel control unit 17.

The fuel control unit 17 serves to control both the supply of fuel passing through the fuel conduit 15 and a supply of fuel passing through a fuel passage 18.

The fuel passage 18 is adapted to deliver to the main combustion equipment 11 a quantity of fuel which is ignited as a result of passing through the main combustion equipment 11, and which thus constitutes a "hot shot" for effecting ignition of the reheat fuel delivered at the reheat burners 14.

The fuel control unit 17 is shown in greater detail in FIGURE 2. Referring to FIGURE 2, the fuel control unit 17 comprises a body 20, within which is formed a passage 21 leading (by means not shown) from tank 16. The passage 21 leads to the low pressure or suction side of a gear pump 22 whose high pressure or delivery side communicates with a passage 23. The passage 23 leads by way of ducts 24, 25 to a valve bore 26 within which is slidably and rotatably mounted a metering valve 27.

The valve bore 26 has ports 30 therein whose cross sectional area increases axially towards the right, the ports 30 collectively constituting a metering orifice. The metering valve 27 has a circumferential recess 31 which is disposed between lands 32, 33, the latter having a radial port 29 extending therethrough. The recess 31 communicates at all times with the duct 25 and also communicates to a lesser or greater extent, depending upon the position of the metering valve 27, with the ports 30. It will be appreciated that as the metering valve 27 is moved towards the right or the left, flow from the recess 31 and through the ports 30 is increased or decreased respectively.

The right hand end of the metering valve 27 has a reduced diameter portion 34 on which is mounted a sleeve 35 and a spring plate 36. A spring 37 is interposed between the spring plate 36 and the right hand end of the valve bore 26.

The sleeve 35 is formed with a circumferential recess 38 which is disposed between lands 40, 41. Any fuel leaking past the land 40 may pass via the recess 38 to a drain passage 42.

The metering valve 27 is provided with a circumferential recess 43, any fuel leaking past the land 33 passing through the recess 43 to a drain passage 44 which leads to the drain passage 42.

The body 20 is provided with a passage 46 which may be supplied (by means not shown) with air at the delivery pressure ($P_2$) of the engine compressor 10, or at a pressure functionally related thereto.

The passage 46 leads to a chamber 47 which is connected to a chamber 48 by a passage 50. Mounted in the passage 50 is the tapered end of a needle valve 51. The needle valve 51 has a rack 52 which meshes with a pinion 53, the pinion 53 being rotatable by a reheat lever (not shown). Thus the pressure in the chamber 48 will be $\theta P_2$ where $\theta$ is a function whose value is set by the disposition of the said reheat lever.

The chamber 48 communicates by way of a passage 54 with a pipe 55, the pipe 55 leading to the left hand end of the valve bore 26. The passage 54, which has a fixed restriction 56 therein, also communicates with a pipe 57 which is supplied (by means not shown) with air at a pressure which is the same as, or is functionally related to, the pressure ($P_4$) in the jet pipe 13. The pipe 57 also communicates with the right hand end of the valve bore 26.

As will readily be seen, the pressures $\theta P_2$ and $P_4$ act on opposite ends of the metering valve 27 and are balanced against each other by the spring 37. The arrangement is such that the position of the metering valve 27 is directly proportional to the value of $\theta P_2$. Movement of the said reheat lever thus alters the position of the metering valve 27 and hence adjusts the quantity of fuel passing through the ports 30.

The metering orifice constituted by the ports 30 communicates with a passage 60. Communication between the passage 60 and the fuel conduit 15 is controlled by a pressurising valve 62 having a valve member 63 which is urged towards the closed position by a valve spring 64. The valve spring 64 may be such that the fuel pressure acting on the valve member 63 must be, say, at least 130 p.s.i., before the pressurising valve 62 will open to allow reheat fuel to pass through the fuel conduit 15 to the reheat burners 14.

The body 20 also has formed therein a bore 65 within which is slidably and rotatably mounted a throttle valve 66. The throttle valve 66 is formed with a gear 67, the metering valve 27 being formed with a gear 68. The gears 67, 68 mesh with a common gear 70 which is mounted on an engine driven shaft 71. Thus the metering valve 27 and throttle valve 66 may be rotated so as to diminish the risk of these valves sticking within their respective valve bores 26, 65.

The valve bore 65 has ports 72 therein flow through which is controlled by the position of the left hand end of the throttle valve 66. A spring plate 73 bears against the right hand end of the throttle valve 66, and a spring 74 is interposed between the spring plate 73 and the right hand end of the valve bore 65.

The left hand end of the valve bore 65 communicates by way of a duct 75 with the ducts 24, 25 and hence with the upstream side of the metering orifice. The right hand end of the valve bore 65 communicates by way of a passage 76 with a passage 77 leading to the passage 60, the passage 77 having a fixed restriction 78 therein. The right hand end of the valve bore 65 thus communicates with the downstream side of the metering orifice.

The throttle valve 66 will therefore be positioned in accordance with the pressure drop across the metering orifice.

The metering valve 27 has a central bore 79 therein which communicates with the duct 25 by way of the radial port 29 and with a chamber 80 by way of a passage 79'. The port 29, bore 79, and passage 79' provide for a flow of cooling fuel through the centre of the metering valve 27.

The ports 72 lead to the chamber 80 so as to provide for the lubrication of the gears 67, 68, 70. The ports 72 also lead to a duct 81 which communicates with the right hand end of a valve bore 82 of a shut-off cock.

The duct 81 also communicates by way of a passage 83 with a duct 84. The duct 84, which has a fixed restriction 85 therein, leads to the passage 21 and hence to the low pressure side of the gear pump 22.

The duct 84 also communicates with a pipe 86 through which fuel may spill to the inlet of a pump (not shown) of the main fuel system (not shown) which controls the fuel supply to the main combustion equipment 11. The provision of the pipe 86 ensures that a proportion of the fuel circulated by the gear pump 22 passes to the said pump of the main fuel system and is replaced by fresh fuel, thus preventing overheating.

It will thus be appreciated that if the pressure drop across the metering orifice should be increased, the throttle valve 66 will move towards the right whereby to permit greater flow of fuel through the ports 72 and via the duct 81, the passage 83, and the duct 84 to the low pressure side of the gear pump 22. In consequence, the pressure on the high pressure side of the gear pump 22 will fall, whereby the pressure drop across the metering orifice will fall correspondingly.

If, on the other hand, the pressure drop across the metering orifice should fall, the throttle valve 66 will move towards the left whereby to diminish flow through the ports 72 to the low pressure side of the gear pump 22. Accordingly, the pressure on the high pressure side of the gear pump 22 will rise, and the pressure drop across the metering orifice will rise correspondingly.

The throttle valve 66 thus serves to maintain the pressure drop across the metering orifice substantially constant, e.g. at 50 p.s.i.

Mounted within the valve bore 82 is an axially slidable valve member 90 having a circumferential recess 91 and an axially extending passage 92 therethrough. The valve bore 82 has ports 93, 94 therein, the ports 93 communicating with the duct 81 and the ports 94 communicating with a passage 95 which leads to the passage 23 and hence to the high pressure side of the gear pump 22.

The valve member 90 has an axial extension 96 which is formed with a rack 97, the rack 97 being in mesh with a pinion 98. The pinion 98 may be rotated by a lever (not shown) so as to move the valve member 90 between the position shown, in which it cuts off communication between the ports 93, 94, and a position (not shown) in which it establishes communication between the said ports. When the valve member 90 is in the latter position, fuel may circulate from the high pressure side of the gear pump 22 and may pass via the passages 23, 95, ports 94, circumferential recess 91, port 93, duct 81, passage 83, duct 84, and passage 21 to the low pressure side of the gear pump 22.

The axial passage 92 through the valve member 90 is provided to ensure the pressure balancing of the valve member 90.

A solenoid valve 100 has a valve member 101 which controls flow through the duct 84. The valve member 101 is urged towards the closed position by a spring 102. A solenoid 103 is provided to permit opening movement of the valve member 101 against the action of its spring 102. De-energisation of the solenoid 103 is effected (by means not shown) whenever the said reheat lever is placed in the position to select reheat.

When the solenoid 103 is energised, the valve member 101 is, as shown in FIGURE 2, spaced from its valve seating whereby to permit free flow of fuel from the passage 77 to the duct 84. The fuel will therefore take this path in preference to passing into the fuel conduit 15 against the resistance of the pressurising valve 62.

When however the solenoid 103 is de-energised, that is to say when re-heat is selected, the valve member 101 moves onto its seating and flow from the passage 77 to the duct 84 is interrupted. Accordingly the pressure of the fuel in the passage 60 rises until it overcomes the pressurising valve 62 and flows out through the fuel conduit 15 to the reheat burners 14.

It will be appreciated that a fail-safe arrangement is provided, inasmuch as if the electrical system should break down the solenoid 103 will be de-energised and the valve member 101 will therefore be in the closed position in which fuel may be supplied to the reheat burners 14.

The valve bore 65 communicates by way of a fuel passage 105 with the left hand end of a valve bore 106, which is formed in a valve body 107. The valve bore 106 is provided with ports 110, 111, the ports 110 leading to a fuel duct 112, and the ports 111 leading to a drain passage 113 which may, for example, extend (by means not shown) to the low pressure side of the gear pump 22.

Slidably mounted within the valve bore 106, is a hollow piston 114 having an axial passage 115 through its end wall 116. The curved wall of the piston 114 is provided with a circumferential recess 117 which is adapted to be brought into communication with the drain passage 111. The circumferential recess 117 communicates with the interior of the piston 114 by means of radial ports 118 in the piston 114. A spring 120 is mounted within the piston 114 and urges the latter towards the left.

The valve body 107 is formed with a central boss 121 having a chamber 122 formed therein. Within the chamber 122 there is mounted a valve member 123 which is adapted to be brought into contact with the piston 114 so as to prevent flow through the axial passage 115. A spring 124 urges the valve member 123 towards the left.

The valve body 107 also has a valve bore 125 therein in which is slidably mounted a flow control valve 126. The flow control valve 126 is urged by a spring 127 towards the left and towards the position shown in FIGURE 2 in which it prevents communication between a passage 128, which communicates with the interior of the piston 114, and the fuel passage 18 which leads to the main combustion equipment 11.

The right hand end of the valve bore 125 communicates both with the fuel duct 112 and, by way of a restriction 130, with a passage 131 leading to the drain passage 113.

In operation, when it is desired to select reheat, the said reheat lever is moved so as to rotate the pinion 53 and hence move the needle valve 51. This causes the metering valve 27 to be disposed in a position which depends upon the extent to which the reheat lever has been moved. Fuel from the high pressure side of the gear pump 22 will thus pass via the passage 23, ducts 24, 25 and circumferential recess 31 through the metering orifice constituted by the ports 30 to the passage 60. The solenoid 103 will, at this time, be de-energised and the pressure in the passage 60 will therefore rise until the pressurising valve 62 opens and permits fuel to flow through the fuel conduit 15 to the reheat burners 14.

This rise in pressure in the passage 60 will, however, cause a corresponding rise in the pressure in the fuel passage 105 which communicates therewith. Accordingly the parts within the valve body 107 will start to move from the FIGURE 2 position, which corresponds to the position prior to the selection of reheat, and into or towards the FIGURE 3 position.

As will be seen from FIGURE 3, the high pressure fuel passing through the fuel passage 105 acts on the left hand side of the end wall 116 of the piston 114. The interior of the piston 114 will, however, at this time, be full of fuel at a pressure which is substantially the same as that of the low pressure side of the gear pump 22. The piston 114 will therefore be moved towards the right. This will cause the quantity of fuel within the piston 114 to pass through the passage 128 and so force the flow control valve 126 towards the right. Fuel from within the piston 114 will therefore flow to the fuel passage 18 and hence to the main combustion equipment 11 so as to form the "hot shot" employed in the ignition of the reheat fuel at the reheat burners 14.

After a short time, however, the piston 114 will, as shown in FIGURE 4, reach the position in which the left hand end of the said piston permits flow through the ports 110. When this occurs, the high pressure fuel from the fuel passage 105 will pass from the left hand end of the valve bore 106 and through the ports 110 and fuel duct 112 to the right hand end of the flow control valve 126. The latter will therefore be maintained in the position in which it prevents communication between the passage 128 and the fuel passage 18. At the same time the wall 116 of the piston 114 will contact the valve member 123 so as to prevent flow through the axial passage 115. Fuel which has been trapped within the interior of the piston 114 may escape to the drain passage 113 by way of the ports 118 and the circumferential recess 117.

It will thus be appreciated that a measured quantity only of fuel passes out through the fuel passage 18 so as to constitute the "hot shot" at the beginning of the selection of reheat. Once this initial quantity of fuel has passed, however, no further fuel may pass through the fuel passage 18 until reheat is shut off and the parts are restored to the position shown in FIGURE 2. This provision of a limited quantity of fuel to form the hot shot prevents carbonisation at the downstream end of the fuel passage 18.

When reheat is switched off, the parts within the valve body 107 will, initially, be in the positions shown in FIGURE 4. The parts within the body 20, however, will, on the switching off of the reheat, be restorted to the positions shown in FIGURE 2. The fuel pressure in the fuel passage 105 will therefore be substantially the same as that on the low pressure side of the gear pump 22.

When the parts within the valve body 107 are in the FIGURE 4 position, however, the drain passage 113, which leads to the low pressure side of the gear pump 22, communicates with the interior of the piston 114 by way of the radial ports 118. The pressures on opposite sides of the end wall 116 of the piston 114 will therefore be equal.

The piston 114 will therefore be moved towards the left under the action of the spring 120 until it eventually reaches the position shown in FIGURE 2. During this movement of the piston 114 towards the left, the drain passage 113 will become cut off from communication with the interior of the piston 114. Low pressure fuel from the fuel passage 105 will therefore flow through the axial passage 115 so as to fill the interior of the piston 114 with low pressure fuel. The interior of the piston 114 will therefore be primed for the next "hot shot."

In FIG. 5 there is shown a modification of the valve body 107 of FIGS. 2–4.

In the FIG. 5 construction, the fuel passage 105 communicates with a fuel duct 140 within a valve body 141. Mounted within the valve body 141 is a fixed sleeve 142 having radial ports 143 communicating with the fuel duct 140.

The fuel duct 140 communicates with a passage 144 which leads, by way of passages 145, 146, to the interior of the fixed sleeve 142.

Slidably mounted within the fixed sleeve 142 is a hollow piston 147. The piston 147 has an end wall 150 which is bored to receive a plug 151 having a passage 152 therethrough.

The piston 147 is urged towards the position shown in FIGURE 5 by a spring 153 which acts against a substantially cylindrical member 154 which is bolted within the valve body 141.

Mounted within the member 154, and spaced therefrom by an annular passage 155, is a fixed sleeve 156 which defines within the member 154 a chamber 157. A valve member 160 is slidably mounted in the chamber 157 and extends through a hole 161 in the wall of the chamber, a spring 162 urging the valve member 160 towards the left. The valve member 160 is adapted to prevent flow through the passage 152 when the piston 147 has been moved sufficiently towards the right.

The curved wall 163 of the piston 147 has radial ports 164 therein which communicate with the interior of the piston 147. When the piston 147 has been moved sufficiently towards the right, the ports 164 are brought into communication with radial ports 165 in the fixed sleeve 142 and so with a drain passage 166 in the valve body 141.

The drain passage 166 communicates, by way of a drain passage 167, with the low pressure side of the gear pump 22.

The curved wall 163 of the piston 147 is formed with an annular recess 170. When the piston 147 has been moved sufficiently towards the right, the recess 170 communicates both with the radial ports 143 in the fixed sleeve 142 and with radial ports 171 therein.

The radial ports 171 communicate with a fuel duct 172 which is formed in the valve body 141. The fuel duct 172 communicates with the annular passage 155 by way of fuel ducts 173, 174 formed respectively in the valve body 141 and the member 154. The fuel duct 173 also communicates by way of a filter 175 and a drain passage 176 with the drain passage 166.

Mounted within the fixed sleeve 156 is a hollow flow control valve 177. The flow control valve 177 is urged by a spring 180 against a valve seat 181 on a stud 182, the stud 182 being mounted on an end wall member 183 which is bolted to the valve body 141. The stud 182 has a fuel passage 184 therethrough which leads (by means not shown) to the fuel passage 18.

The fixed sleeve 156 has radial ports 185 therein which communicate at all times with the interior of the flow control valve 177.

The member 154 has a passage 186 which, when the piston 147 is in the position shown in FIG. 5, communicates with the interior of the piston 147. The passage 186 communicates with an annular recess 187 in the end wall member 183. The recess 187 communicates with the interior of the member 154 and so with radial ports 190 in the fixed sleeve 156, the ports 190 communicating with the interior of the fixed sleeve 156 to the right of the flow control valve 177.

FIGURE 5 shows the position of the parts prior to the selection of reheat. In the FIGURE 5 position, the interior of the piston 147 will be full of fuel which will be at a pressure substantially the same as that on the low pressure side of the gear pump 22. This fuel pressure will also act on the right hand side of the flow control valve 177 by way of the passage 186, the recess 187 and the ports 190. The fuel pressure within the piston 147 will not, however, at this time act on the left hand side of the flow control valve 177 since the piston 147 will at this time prevent flow through the ports 171. The flow control valve 177 will therefore be seated by the spring 180 on the valve seat 181, whereby fuel flow to the fuel passages 184, 18 will be prevented.

When reheat is selected, the pressure in the fuel passage 105 rises, as discussed above, and this increased pressure will act on the left hand side of the end wall 150 of the piston 147 so as to move the latter towards the right against the action of the spring 153.

This will cause the quantity of fuel within the piston 147 to flow through the passage 186, recess 187 and ports 190 so as to force the flow control valve 177 towards the left. Fuel from within the piston 147 will therefore flow to the fuel passage 18 and hence to the main combustion equipment 11 so as to form the "hot shot" employed in the ignition of the reheat fuel at the reheat burners 14.

After a short time, however, the piston 147 will be forced fully towards the right and into a position in which the recess 170 communicates with the ports 143, 171 and the ports 164 communicate with the drain passage 166. When this occurs, the high pressure fuel from the fuel passage 105 will pass through the fuel duct 140, ports 143, recess 170, ports 171, fuel ducts 172, 173, 174, annular passage 155, and ports 185 to the left hand side of the flow control valve 177. The latter will therefore be seated on the valve seat 181 whereby to prevent fuel being supplied to the fuel passage 184. At the same time, the valve member 160 will prevent flow through the passage 152.

Fuel which has been trapped within the interior of the piston 147 may escape to the drain passage 166 by way of the ports 164, 165.

When reheat is switched off, the fuel pressure in the fuel passage 105 will drop so as to become substantially the same as that on the low pressure side of the gear pump 22. The interior of the piston 147 will, however, at this time communicate with the drain passage 166. The pressures on opposite sides of the end wall 150 of the piston 147 will therefore be equal.

The piston 147 will therefore be moved towards the left under the action of the spring 153 until it eventually reaches the position shown in FIG. 5. During this movement of the piston 147 towards the left, the drain passage 166 will become cut off from communication with the interior of the piston 147. Low pressure fuel from the fuel passage 105 will therefore flow through the passage 152 so as to fill the interior of the piston 147 with low pressure fuel. The interior of the piston 147 will therefore be primed for the next "hot shot."

The embodiments of the invention is which an exclusive property or privilege is claimed are defined as follows.

We claim:

1. A gas turbine engine comprising in flow series a compressor, main combustion equipment, a turbine and an exhaust duct, reheat combustion equipment mounted in said exhaust duct and having a fuel conduit leading thereto, a source of reheat fuel, control means settable to operative and inoperative positions in which it respectively permits and cuts off a flow of reheat fuel from said source to said fuel conduit, and means for supplying to the main combustion equipment a quantity of fuel to form a "hot shot" adapted to ignite the reheat fuel at the reheat combustion equipment, the "hot shot" supply means comprising a fuel passage and a flow control valve therein which is resiliently urged towards the closed position, the fuel passage, on the upstream side of the flow control valve, communicating with the fuel conduit so that the fuel pressures in said fuel conduit and said fuel passage are functionally related to each other, whereby when the control means is set in the operative position the fuel pressure in the fuel passage rises so as to effect opening of the flow control valve, a second valve provided in said fuel passage upstream of the flow control valve, a fuel duct, said second valve controlling fuel flow into the fuel duct and being adapted to be opened by the pressure in the fuel passage the fuel duct communicating with the flow control valve so as to be adapted to apply pressure thereto in a valve closing direction, and means resiliently urging the second valve towards a closed position.

2. A gas turbine engine comprising in flow series a compressor, main combustion equipment, a turbine and an exhaust duct, reheat combustion equipment mounted in said exhaust duct and having a fuel conduit leading thereto, a source of reheat fuel, control means settable to operative and inoperative positions in which it respectively permits and cuts off a flow of reheat fuel from said source to said fuel conduit, and means for supplying to the main combustion equipment a quantity of fuel to form a "hot shot" adapted to ignite the reheat fuel at the reheat combustion equipment, the "hot shot" supply means comprising a fuel passage and a flow control valve therein which is resiliently urged towards the closed position, the fuel passage, on the upstream side of the flow control valve, communicating with the fuel conduit so that the fuel pressures in said fuel conduit and said fuel passage are functionally related to each other, whereby when the control means is set in the operative position the fuel pressure in the fuel passage rises so as to effect opening of the flow control valve, a second valve provided in said fuel passage upstream of the flow control valve, a fuel duct, said second valve controlling fuel flow into the fuel duct and being adapted to be opened by the pressure in the fuel passage, the fuel duct communicating with the flow control valve so as to be adapted to apply pressure thereto in a valve closing direction, means resiliently urging the second valve towards a closed position, and a drain passage, the second valve when open establishing communication between the fuel passage and the drain passage, whereby all the fuel passing through the fuel passage is passed to the drain passage so as to by-pass the main combustion equipment.

3. A gas turbine engine comprising in flow series a compressor, main combustion equipment, a turbine and an exhaust duct, reheat combustion equipment mounted in said exhaust duct and having a fuel conduit leading thereto, a source of reheat fuel, control means settable to operative and inoperative positions in which it respectively permits and cuts off a flow of reheat fuel from said source to said fuel conduit, a fuel control unit which regulates the quantity of reheat fuel supplied to the reheat combustion equipment and which is interposed between the said source of reheat fuel and the said control means, the fuel control unit comprising a metering orifice, a pump for pumping the reheat fuel through said metering orifice, means for varying the flow through the metering orifice, a by-pass passage extending between the low and high pressure sides of said pump, a shut-off valve controlling flow through said by-pass passage, and pressure regulating means for ensuring that the pressure drop across the metering orifice is maintained to within a desired range, and means for supplying to the main combustion equipment a quantity of fuel to form a "hot shot" adapted to ignite the reheat fuel at the reheat combustion equipment, the "hot shot" supply means comprising a fuel passage and a flow control valve therein which is resiliently urged towards the closed position, the fuel passage, on the upstream side of the flow control valve, communicating with the fuel conduit so that the fuel pressures in said fuel conduit and said fuel passage are functionally related to each other, whereby when the control means is set in the operative position the fuel pressure in the fuel passage rises so as to effect opening of the flow control valve, a second valve provided in said fuel passage upstream of the flow control valve, a fuel duct, said second valve controlling fuel flow into the fuel duct and being adapted to be opened by the pressure in the fuel passage, the fuel duct communicating with the flow control valve so as to be adapted to apply pressure thereto in a valve closing direction, means resiliently urging the second valve towards a closed position, and a drain passage, the second valve when open establishing communication between the fuel passage and the drain passage, whereby all the fuel passing through the fuel passage is passed to the drain passage so as to by-pass the main combustion equipment.

4. A gas turbine engine as claimed in claim 3 in which the pressure regulating means comprises a throttle valve which controls flow through a by-pass duct extending between the low and high pressure sides of said pump, opposite pressure faces of said throttle valve being respectively subjected to pressure prevailing on opposite sides of said metering orifice.

5. A gas turbine engine as claimed in claim 3 in which the means to vary the flow through the metering orifice comprises a metering valve movable to vary the flow through the metering orifice, means for applying to oppositely facing pressure surfaces of said metering valve pressures which are functionally related to engine operating pressures, and means for varying the pressure applied to one of said pressure surfaces.

6. A gas turbine engine as claimed in claim 3 in which the said fuel conduit contains a pressurising valve which is maintained open only when the fuel pressure in said fuel conduit exceeds a predetermined value, the fuel conduit, on the upstream side of said pressurising valve, communicating with a drain conduit flow through which is controlled by the said control means, whereby when the said control means is open to permit free flow through the said drain conduit, flow through the fuel conduit is prevented by the pressurising valve.

References Cited in the file of this patent
UNITED STATES PATENTS

| | | |
|---|---|---|
| 2,640,316 | Neal | June 2, 1953 |
| 2,819,587 | Coar | Jan. 14, 1958 |
| 2,899,798 | Broders | Aug. 18, 1959 |
| 2,953,899 | Sorensen | Sept. 27, 1960 |